July 10, 1962 K. GAUKSTERN 3,043,479
AUTOMATIC FEEDING APPARATUS
Filed Oct. 13, 1958
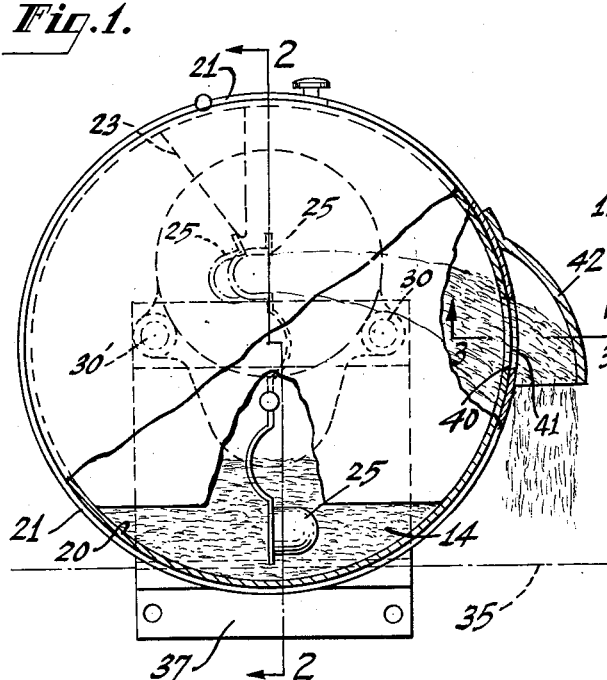
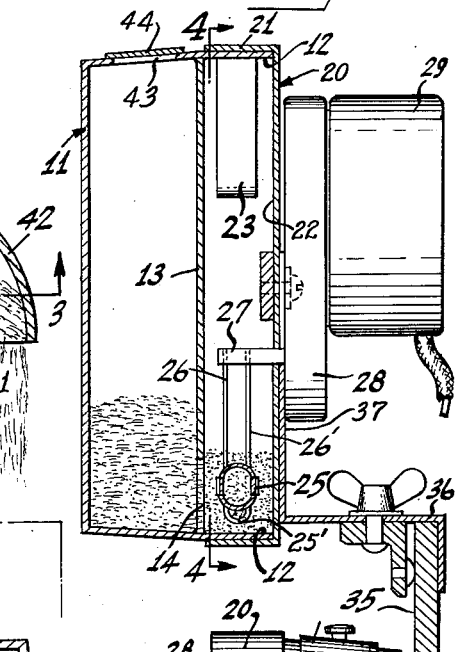
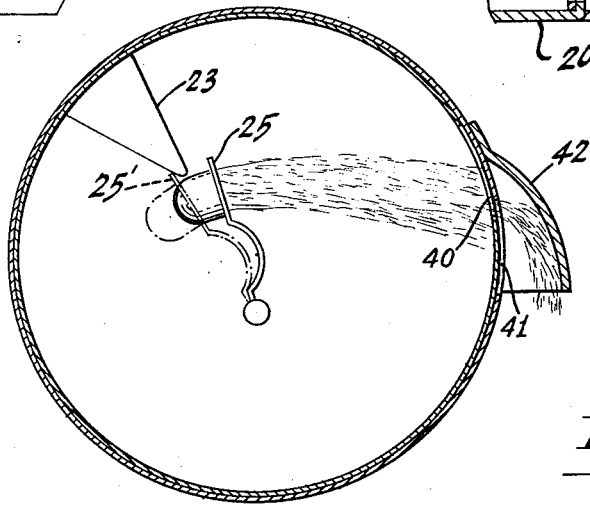
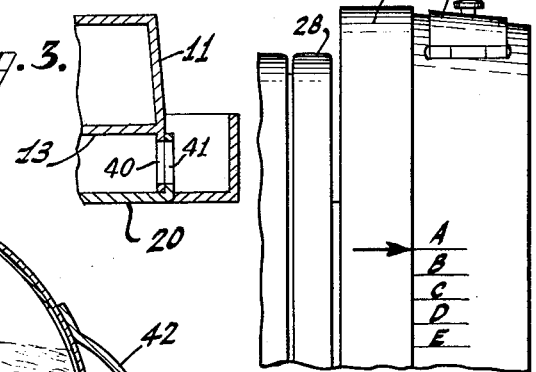
INVENTOR.
KARL GAUKSTERN
BY
William A. Zalesak
ATTORNEY

United States Patent Office
3,043,479
Patented July 10, 1962

3,043,479
AUTOMATIC FEEDING APPARATUS
Karl Gaukstern, Union, N.J., assignor to Ernest R. Tretola, Cranford Township, N.J.
Filed Oct. 13, 1958, Ser. No. 766,850
3 Claims. (Cl. 222—129)

My invention relates to automatic feeding apparatus of improved design. Although primarily intended for fish feeding apparatus, it can be used for feeding animals as well.

While fish raised in tanks do not require much food, if an excess of food is supplied, this food sinks to the bottom of the tank with undesirable results such as the generation of gases harmful to fish and deflation of the oxygen content of the water. A measured amount of food therefore at periodic intervals must be supplied. This measured amount depends upon both the kind of fish as well as the number.

It is therefore an object of my invention to provide a new and improved feeder capable of dispensing accurately measured amounts of food.

A further object of my invention is to provide such a device which is simple in structure, has long wearing parts and which is capable of keeping the food in the storage compartment dry and fresh for long periods of time.

A still further object of my invention is to provide an apparatus which is fully automatic and which can be easily adjusted to feed different amounts of food per period of time.

In accordance with my invention, I provide a two-part food storage and dispensing apparatus in which the food is fed from the storage compartment into the dispensing compartment. These two parts which are telescoped together have registering openings which can be overlapped when the two parts are rotated relative to each other. These openings open up into a spout or chute for directing dispensed food downwardly into a fish tank or other feeding bin.

Mounted within the dispensing compartment is a rotatable scoop or food cup which is mounted on spring arms and whose path is directed through the bottom of the feeding compartment. A cam cooperates with the end of the arm to retard rotation of the scoop and to put tension on the arms which are released suddenly to project the food in the scoop through the opening into the chute thus insuring an accurately measured amount of food into the tank, the amount being determined by the resultant opening of the overlapped openings of the two compartments.

An electrically driven gear train is connected by a shaft to rotate the scoop through one revolution every 24 hours or for whatever time the cycle is set. A bracket attached to one of the parts mounts the apparatus on the tank. The heat from the motor helps keep the food dry.

The detailed description of my invention follows, reference being had to the drawing, in which:

FIG. 1 is a side elevation with portions broken away to show details of construction;

FIG. 2 is a vertical section taken along the line 2—2 of FIG. 1;

FIG. 3 is a partial section taken along the line 3—3 of FIG. 1;

FIG. 4 is a partial section taken along the line 4—4 of FIGURE 2 and showing a different opening setting from FIG. 1 and the action in dotted lines of the spring leaf supported scoop for projecting the food into the chute;

FIG. 5 is a partial elevation showing the relative positions of the parts when the opening is the smallest;

FIG. 6 shows the details of the food cup and its support on the spring arms.

Referring to the drawings, the dispenser includes the two-part housing, including the storage part 11, having a flange 12, and a wall 13 having an opening 14 through which the food is fed into the dispensing compartment.

The dispensing compartment is formed by the other part 20, which is provided with a flange 21 telescoped over the flange 12. It is closed by the wall member 22. Attached to the flange 12 is the cam member 23 the position of which is changed as the two parts 11 and 20 are rotated relative to each other to control the feeding opening as will be described.

Mounted on the wall 22 of the part 20 is the rotatable scoop or feed cup 25. It is supported on the spring wire arms 26, 26′ which are attached to the shaft 27, driven through the gear box 28 by electrically driven motor 29. The gear box 28 and motor 29 are secured to the wall 22 by screws and nuts 30, 30′. The entire assembly is mounted on the tank 35 by adjustable clamp and bracket 36 having plate 37 attached to the wall 22.

As best shown in FIGS. 1 and 4, the part 11 is provided with an opening 40 and the part 20 with the opening 41. Relative rotation of the parts 11 and 20 determines the size of the resultant opening through which the food is discharged, acting as a measuring device. This can be seen by comparing the position of the parts 11 and 20 as shown in FIGS. 1 and 4.

The storage part 11 may be provided with an opening 43 closed by cover 44 through which food may be directed to fill the compartment or the parts may be separated and part 11 filled through opening 14. Since the compartment containing the food is air tight, it is dry and can be filled so that the apparatus will automatically feed food over a long period of time. Because of the unusual action of the feeding cup, food does not inadvertently fall into the tank 35 thus assuring accurate feeding. Cleaning is extremely easy. The apparatus is extremely dependable because of its simple structure.

In operation, as the food cup 25 is slowly rotated, it passes through the bottom of the dispensing compartment picking up a charge of food to be dispensed. When the tip or loop 25′ engages the cam 23, it is temporarily stopped as the shaft 27 continues to rotate. This tensions the members 26 and 26′ until the tip 25′ snaps loose. This causes the cup to be snapped so that it throws the food through the opening formed by the two parts of the housing into the chute 42, which directs the food downwardly into the tank.

Referring to FIG. 5, parts 11 and 20 of the housing can be rotated with respect to each other as described above. The indicia A to E in FIGURE 5 indicate the size of the resultant opening between openings 40 and 41 for measuring out predetermined amounts of food for different numbers and kinds of fish according to charts which are supplied with the feeding apparatus.

What is claimed is:

1. A feeding apparatus including a two-part housing, the parts of said housing being rotatable with respect to each other, one of said parts providing a storage compartment and the other of said parts providing a dispensing compartment, a food scoop rotatably mounted within the dispensing compartment and having a path of travel through the bottom of the dispensing compartment, said parts having a communicating opening for feeding food from the storage compartment into the dispensing compartment, a flexible support for said scoop, and means for engaging said support during rotation of said scoop for temporarily delaying rotary movement of said scoop to bias said support whereby upon release of said scoop the food in said scoop is projected forcibly in a directed path, said parts having openings in the walls thereof for forming a discharge opening when said openings communicate with each other, the size of the resultant opening being regulated by rotating the parts of said housing relative to each other, said path being directed through said discharge opening.

2. A feeding apparatus including a two-part housing, said parts having telescoping flanges and being relatively rotatable, one of said parts providing a storage compartment and the other of said parts providing a dispensing compartment, a shaft rotatably mounted in said dispensing compartment, a flexible support mounted on said shaft, a food scoop mounted on said flexible support within the dispensing compartment and having a path of travel through the bottom of the dispensing compartment, said parts having a communicating opening for feeding food from the storage compartment into said dispensing compartment, means for engaging said support during rotation of said scoop for temporarily delaying rotary movement of said scoop to bias said support, said compartments having openings in the walls thereof through which food can be dispensed when said openings communicate with each other, the size of the resultant opening being regulated by rotating the parts of said housing relative to each other, said scoop upon release of said support and scoop forcibly projecting food through said resultant opening.

3. A feeding apparatus including a two-part housing, said parts having telescoping flanges and being relatively rotatable, one of said parts providing a storage compartment and the other of said parts providing a dispensing compartment, a shaft rotatably mounted in said dispensing compartment, a flexible support mounted on said shaft, a food scoop mounted on said flexible support within the dispensing compartment and having a path of travel through the bottom of the dispensing compartment, said parts having a communicating opening for feeding food from the storage compartment into said dispensing compartment, means for engaging said support during rotation of said scoop for temporarily delaying rotary movement of said scoop to bias said support, said compartments having openings in the walls thereof through which food can be dispensed when said openings communicate with each other, the size of the resultant opening being regulated by rotating the parts of said housing relative to each other, said scoop upon release of said support and scoop forcibly projecting food through said resultant opening, and a chute mounted on said housing for directing the projected food along a predetermined path.

References Cited in the file of this patent

UNITED STATES PATENTS

| | | |
|---|---|---|
| 601,897 | Michon | Apr. 5, 1898 |
| 808,588 | Tracy | Dec. 26, 1905 |
| 2,847,066 | Kleiber et al. | Aug. 12, 1958 |

FOREIGN PATENTS

| | | |
|---|---|---|
| 3,760 of 1931 | Australia | Aug. 28, 1931 |
| 467,955 | Italy | Dec. 28, 1951 |